US011140019B2

(12) United States Patent
Sherr

(10) Patent No.: US 11,140,019 B2
(45) Date of Patent: Oct. 5, 2021

(54) SOFTWARE-DEFINED NETWORK RESOURCE PROVISIONING ARCHITECTURE

(71) Applicant: David M. Sherr, Pleasant Hill, CA (US)

(72) Inventor: David M. Sherr, Pleasant Hill, CA (US)

(*) Notice: Subject to any disclaimer, the term of this patent is extended or adjusted under 35 U.S.C. 154(b) by 320 days.

(21) Appl. No.: 16/422,867

(22) Filed: May 24, 2019

(65) Prior Publication Data
US 2019/0372826 A1  Dec. 5, 2019

Related U.S. Application Data

(60) Provisional application No. 62/679,599, filed on Jun. 1, 2018.

(51) Int. Cl.
*H04L 12/24* (2006.01)
*H04L 12/715* (2013.01)
*H04W 84/18* (2009.01)

(52) U.S. Cl.
CPC ........ *H04L 41/046* (2013.01); *H04L 41/0806* (2013.01); *H04L 41/16* (2013.01); *H04L 45/64* (2013.01); *H04W 84/18* (2013.01)

(58) Field of Classification Search
None
See application file for complete search history.

(56) References Cited

U.S. PATENT DOCUMENTS

| | | |
|---|---|---|
| 6,611,755 B1 | 8/2003 | Coffee et al. |
| 7,174,363 B1 | 2/2007 | Goldstein et al. |
| 7,246,009 B2 | 7/2007 | Hamblen et al. |
| 7,444,443 B2 | 10/2008 | Sharma et al. |
| 8,249,910 B2 | 8/2012 | Wellman et al. |
| 8,725,886 B1 | 5/2014 | Pulier et al. |
| 8,832,244 B2 | 9/2014 | Gelvin et al. |
| 8,886,841 B2 | 11/2014 | Goldstein et al. |
| 9,378,055 B1 | 6/2016 | Standley et al. |
| 9,858,127 B2 | 1/2018 | Standley et al. |
| 10,049,335 B1 | 8/2018 | Narkier et al. |
| 10,057,189 B2 | 8/2018 | Battersby et al. |

(Continued)

OTHER PUBLICATIONS

The International Search Report and The Written Opinion of the International Searching Authority, dated Oct. 1, 2019 issued in the International Application No. PCT/US2019/034563, 10 pages.

(Continued)

*Primary Examiner* — Mohamed Ibrahim
(74) *Attorney, Agent, or Firm* — Kilpatrick Townsend & Stockton LLP

(57) ABSTRACT

Embodiments are directed to an overlay network for an industrial Internet of Things. The overlay network has multiple main components: (1) a security component, such as a cloaked network, (2) a digital twin component that operates as digital simulations of the physical devices, (3) a communications mesh, and (4) a resource provisioning matrix for adjusting the resources used by the digital twin. The overlay network is a virtual network that is Software Defined—it sits on top of the existing Internet physical hardware of servers, routers, etc. The overlay network is sometimes referred to herein as a Software Defined Secure Content/Context Aware Network (SD-SCAN).

12 Claims, 7 Drawing Sheets

(56) References Cited

U.S. PATENT DOCUMENTS

| | | | |
|---|---|---|---|
| 2010/0217837 A1 | 8/2010 | Ansari et al. | |
| 2012/0016678 A1 | 1/2012 | Gruber et al. | |
| 2012/0131335 A1 | 5/2012 | Bailey et al. | |
| 2014/0380442 A1 | 12/2014 | Addepalli et al. | |
| 2016/0117594 A1 | 4/2016 | Perez Ramos et al. | |
| 2016/0247129 A1 | 8/2016 | Song et al. | |
| 2016/0306683 A1 | 10/2016 | Standley et al. | |
| 2017/0039479 A1* | 2/2017 | Chen | G16H 50/30 |
| 2017/0091791 A1 | 3/2017 | Srinivasan et al. | |
| 2017/0214659 A1 | 7/2017 | Madhav et al. | |
| 2018/0013554 A1* | 1/2018 | Anshel | H04L 9/0838 |
| 2018/0054376 A1* | 2/2018 | Hershey | H04L 12/66 |
| 2021/0029029 A1* | 1/2021 | Mehmedagic | H04L 63/0218 |

OTHER PUBLICATIONS

Zafeiropoulos, Anastasios et al., "Interconnecting smart objects through an overlay networking architecture"; Greek Research and Technology Network (GRNET), Athens, Greece; National Technical University of Athens (NTUA) / UBETECH Ltd., Feb. 11, 2011, Athens, Greece; 3 pages.

Ghofrane Fersi, "A distributed and flexible architecture for Internet of Things," Procedia Computer Science 73 (2015); pp. 130-137; ReDCAD, Department of Computer Science and Applied Mathematics National School of Engineers of Sfax BP 1173-3038 Sfax, Unversity of Sfax, Tunisia; The International Conference on Advanced Wireless, Information, and Communication Technologies (AWICT 2015); Elsevier B.V.

Jin, Jiong et al., "Network Architecture and QoS Issues in the Internet of Things for a Smart City," International Symposium on Communications and Information Technologies (ISCIT), 2012 IEEE, pp. 974-979.

Boehme, Alan D. and Sherr, David M., "Safe IoT infrastructures require Dark Software Defined-Secure Conte(xn)t Aware Networks," copyright 2017-8, pp. 1-17.

Sherr, David M., "Sustainable Competitive Advantage for the New Global Enterprise" Version 3.0, copyright 2004-13, New Global Enterprise, 15 pages.

* cited by examiner

Sample Fitness for Purpose Template: A Profiling Mind Tool

| Service Categories / Activity Realms | Performance 406 | Availability 408 | Mean Time to Recovery 410 | Transactional Level 412 | Data Replication & Retention 414 | Security Level 416 |
|---|---|---|---|---|---|---|
| Counterparty 418 | 404 | 404 | 404 | 404 | 404 | 404 |
| Channel 420 | 404 | 404 | 404 | 404 | 404 | 404 |
| Supply Chain 422 | 404 | 404 | 404 | 404 | 404 | 404 |
| Commodities: Products & Services 424 | 404 | 404 | 404 | 404 | 404 | 404 |
| Codex: Books & Records 426 | 404 | 404 | 404 | 404 | 404 | 404 |

SOFTWARE-DEFINED NETWORK RESOURCE PROVISIONING ARCHITECTURE

CROSS-REFERENCES TO RELATED APPLICATIONS

The present application claims the benefit of U.S. provisional application Ser. No. 62/679,599, filed Jun. 1, 2018, entitled "Network Resource Provisioning Architecture," the disclosure of which is incorporated by reference herein in its entirety.

BACKGROUND OF THE INVENTION

The present invention relates to a network (e.g., cloaked web) architecture for secure, auto-provisioned environments; methods of specifying, monitoring, and enforcing constraint configuration suites of service level policies.

The Internet has expanded greatly so that now many common household or commercial devices are connected to the Internet, including, for example, thermostats, locks, lighting, etc. (the Internet of Things, or IoT). This has occurred in a haphazard manner, with the result of hacking and security breaches, such as where simple devices are sold with a default password that doesn't get changed, providing an access point to the network. We are moving inexorably towards even more massive Internet-instrumented connectivity of cars, traffic lights, smart factories, nuclear reactors, electric grids, etc.

Many people are addressing these security concerns. For example, the Cloud Security Alliance has a Software Defined Perimeter (SDP) Working Group that has proposed a combination of device authentication, identity-based access and dynamically provisioned connectivity. The initial commercial SDP products implemented the concept as an overlay network for enterprise applications. The SDP Initiating Host became a client and the Accepting Host became a Gateway.

What is needed is not only more security, but a re-thinking of the Internet architecture as applied to the IoT. A different structure is needed than for an Internet used to provide advertisements, messages, document sharing and other activities not related to instrumentation.

BRIEF SUMMARY OF THE INVENTION

Embodiments are directed to an overlay network for an industrial Internet of Things. The overlay network has multiple main components: (1) a security component, such as a cloaked network, (2) a digital twin component that operates as digital simulations of the physical devices, (3) a communications mesh, and (4) a resource provisioning matrix for adjusting the resources used by the digital twin. The overlay network is a virtual network that is Software Defined—it sits on top of the existing physical hardware of servers, routers, etc. The overlay network is sometimes referred to herein as a Software Defined Secure Content/Context Aware Network (SD-SCAN).

Embodiments of (1) a security component include the use of a cloaked network architecture. This includes dynamic connections, such as by using address hopping. Additionally, hardened perimeter connections are used, such as ad hoc VPNs. In addition, strong encryption is used.

In embodiments, the (2) digital twins operate as intelligent agents. The digital twins are virtual entities that mirror and actuate all objects of interest. Those objects include devices, sensors, and processing resources.

Embodiments of (3) a communications mesh include a fractal mesh. Each entity may have a separate mesh. The mesh is an enterprise backbone overlay mesh which has connection points that define the context. Context is Local State Maintenance available to processes. Content is State Interchange where processes execute their business rules under policy enforcement. These connection points may include all or a subset of identity management (authentication services), security policy, authority (role-based or token-based permissions), reporting, analytics engine, rules engine, alerting engine, system management (collect and store instrumentation data and provide visibility on system processes) and a knowledge base.

Embodiments of (4) a resource provisioning matrix include a matrix for adjusting the resources used by the digital twin. The resource provisioning matrix provides a set of adjustable (elastic) resource constraints. The resources include processing performance and communications security. Auto-provisioning is provided to automatically marshal resources to satisfy service level demands.

In an embodiment, the provisioning matrix monitors performance, availability, mean time to recovery, transactional level (e.g., guaranteed/not, at least once, at most once, cloaked/open), data replication and retention, and security level. This can be done across a variety of categories, including counterparty, channel, supply chain, commodities (products & services) and codex (books & records).

In an embodiment, a configuration is matched with a desired service level. Constraints corresponding to the desired service level are generated and provisioned as a matrix across the applicable activity realms and service categories. The desired service level may be dictated by a service level agreement.

In an embodiment, intelligent agents are configured and spawned, and provided within the network. The intelligent agents are digital twins that mirror the functions and status of objects (sensors, devices and processes), and also actuate or otherwise control them. In one embodiment, the digital twins are recursively enumerable.

In an embodiment, auto re-genesis is provided by tracking the heartbeat of sensors, devices and processes. The heart beat is a periodic signal indicating continuing functioning. In the absence of a heartbeat, the intelligent agent (digital twin) is deleted and re-generated.

BRIEF DESCRIPTION OF THE DRAWINGS

FIG. 4 is a diagram of a service level constraint profile matrix to determine resource provisioning according to an embodiment.

DETAILED DESCRIPTION OF THE INVENTION

Figure 1:
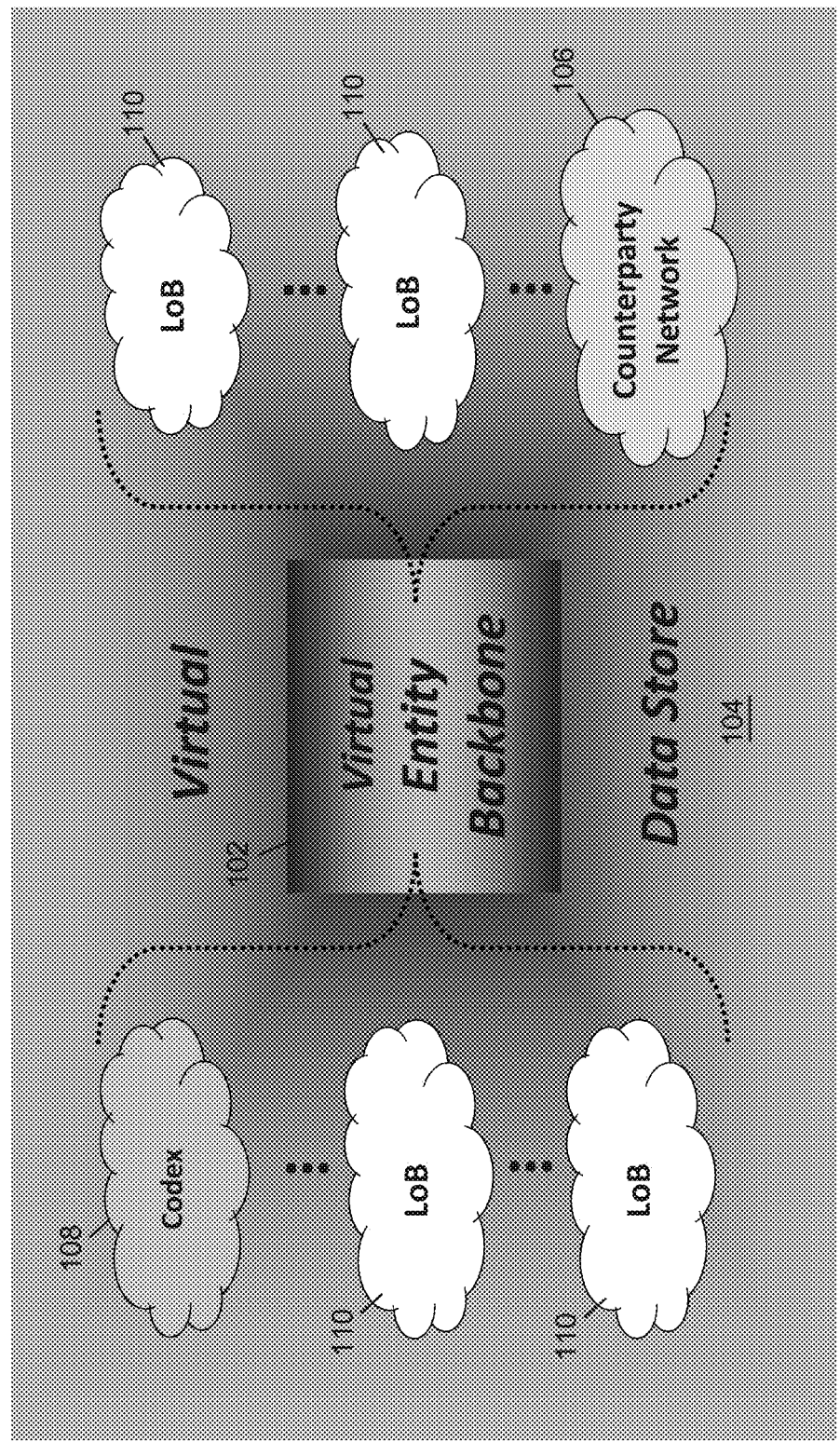
FIG. 1 is a high level diagram of a communications mesh overlay network according to an embodiment.

FIG. 1 is a high level diagram of a communications mesh overlay network according to an embodiment. The illustrated mesh overlay network is a Software Defined-Secure Context/Content Aware Network (SD-SCAN). It is overlaid on the existing Internet (cloud). It shows the network for a particular entity, such as a business or individual.

A Virtual Entity Backbone (VEB) 102 interconnects component clouds with access to a Virtual Data Store (VDS) 104. The Virtual Entity Backbone 102 connects processes via direct deliveries (including data streaming and publish-subscribe) to events by information tags. The connections are performed via service invocation, event distribution, and data streaming protocols. The Virtual Data Store 104 distributes data by marshalling data automatically into appropriate venues. The distribution is performed via data definition, storage, location, and replication transparency protocols. The following component clouds are embedded in the VDS and interact via the VEB.

A Counterparty Network 106 is a distributed peer-to-peer network interconnecting people, virtual entities and things. For a particular business, this would include others that are interacted with particular sensors, equipment, and other elements of that entity's portion of the Internet of Things. For example, for a home security company, it would include vendors for parts (locks, sensors, cameras, etc.), users, servicers (repairs warranties, insurance, etc.), and other parties or things. Each provides data and updates relevant to their part of the overall use, and receives data they need.

A Codex 108 is a database of records needed to support the network. This would include operating manuals for equipment, product specifications, and general business and financial records. A product specification, for example, might specify a maintenance period for an item of equipment, which might trigger a call to a servicer counterparty to perform maintenance on the equipment, message a user to change a sensor battery, etc. Each entity would have its own codex, including the Books and Records.

FIG. 1 shows multiple LoBs 110 (Lines of Business). An LoB can be different operating units of a business, different geographic locations, different categories of products, or any other subdivision of an entity. Each Line of Business has its unique codex records and unique service level requirements.

Figure 2:
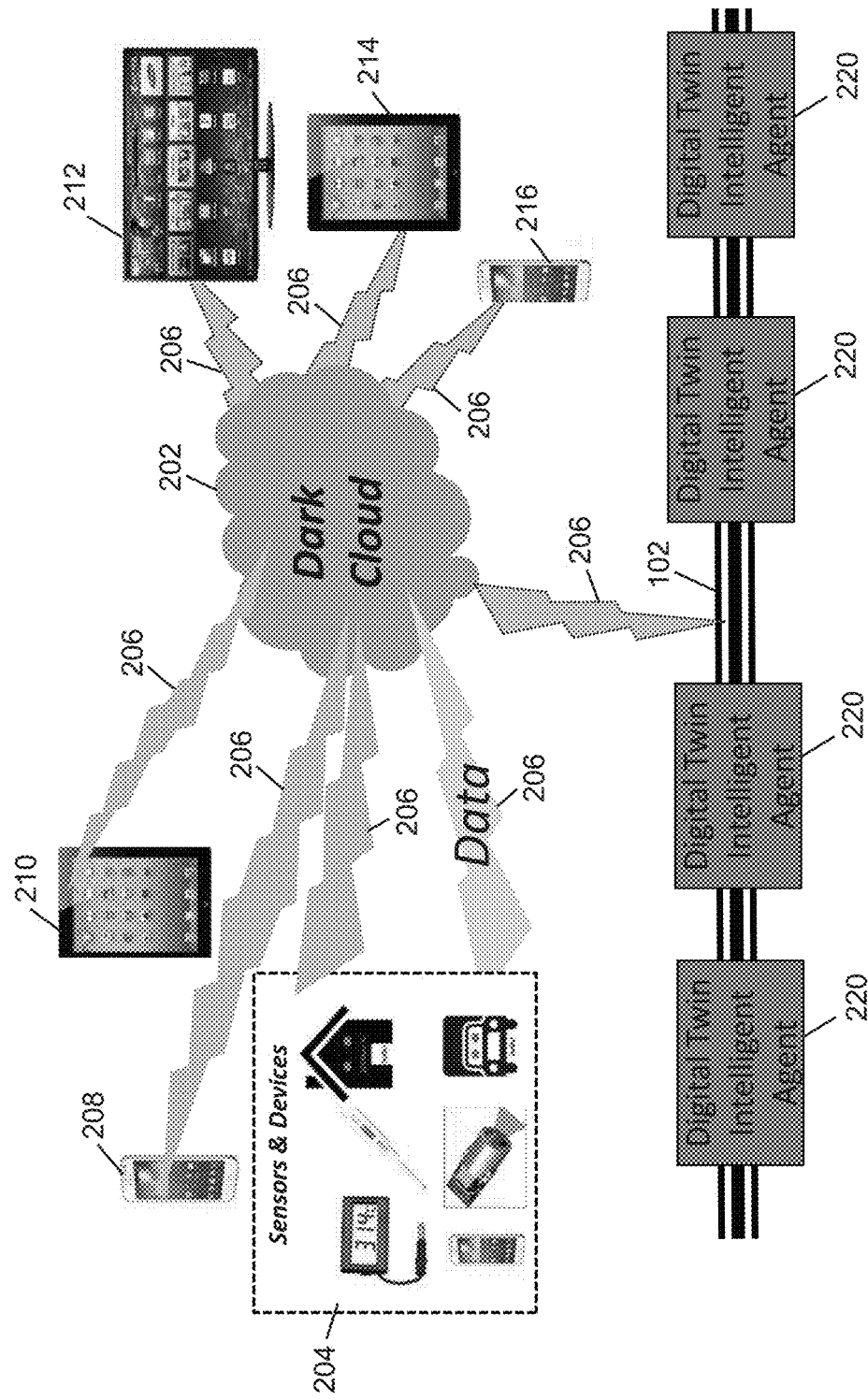
FIG. 2 is a diagram illustrating the component infrastructure of an overlay network according to an embodiment.

FIG. 2 is a diagram illustrating the component infrastructure of an overlay network according to an embodiment. The network connects to all sorts of sensors, gauges, meters and beacons that are located on and within things and spaces of houses, warehouses, stores, byways, and highways. These things are moved among the spaces by cart, forklift, car, conveyor belt, truck, boat, and plane.

A Cloaked (e.g., Dark) Cloud 202 (cloaked network) provides the communications infrastructure overlaid on the existing Internet. Cloud 202 has one, two or all three of the following characteristics: (1) Cloud 202 from center to edge is cloaked via ipv6 address hopping or another dynamic connection scheme. (2) The data is encrypted with a strong encryption method (e.g., triple DES, Federal Information Processing Standard (FIPS) Publication 140-2, or Mocana embedded systems security). (3) Connections are ad hoc, and require a certificate, which may be authenticated via a Software Defined Perimeter protocol.

Sensors and devices 204 are connected to the Cloaked Cloud 202. These sensors and devices can be items in a user's home, machinery in a factory, trucks spread out over the country, or any other grouping of physical sensors and devices. They can be connected to the Cloaked Cloud 202 individually, through a local WiFi, BLE, NFC or other network, in subgroups, or in any other grouping. Examples of the sensors and devices, which communicate from edge to center, include beacons, sensors, and devices (real and virtual), which interact and stream data and control information within the Cloaked Cloud.

Arrows 206 represent both data flows (including operational information flows) and control information flows. These provide streams of operating data flow into, through, and out of the Cloaked Cloud. The operational information flows provide sharing of changes of state (information entropy) of sensors and devices among all components with a need to know. Control information flows include responses from sharing of entropy among the components.

In an embodiment, an illustrated smart phone mobile device 208 and tablet mobile device 210 are shown on the left side of Cloaked Cloud 202, located at a user, factory, or mobile location with the sensors and devices, and can be used to monitor and control the sensors and devices. Other computing devices with user interfaces can be used. These user interfaces can be graphical user interfaces (GUIs), voice interfaces, or other interfaces. On the right side are shown fixed location devices 212, tablets 214 and smart phones 216. These can be associated with a service provider, product provider, business, or other entity. Examples of fixed location devices include desktop computers or other processor devices, SAN/NAS devices, headless servers, gateways, routers, and switches. Alternately, these can be mobile devices. The various devices 208-216 provide ad hoc control instructions, connection from different locations, operational monitoring, and migration transparency, to name just a few functions.

In an embodiment, the Cloaked Cloud 202 connects to a distributed backbone overlay 102, which connects to digital twins (intelligent agents) 220. In one embodiment, backbone overlay 102 is a sub-cloud that is also cloaked, and can be at the edge of the network in the same sensors and devices 204, or any of devices 208 or 210, or devices 212, 214 or 216. Each digital twin 220 corresponds to a sensor or device 204. Alternately, one digital twin can emulate multiple sensors and/or devices 204. The distributed backbone overlay can use one or more of different virtual connections and configurations (software defined), such as broadcast, multicast, point-point, pub-sub, or data streaming protocols. The digital twins (intelligent agents) 220 not only mirror the functions and status of objects (sensors and devices), but can actuate or otherwise control them. In one embodiment, the digital twins are recursively enumerable. The intelligent agents can perform recursive analytics without storing all the data. For example, to calculate an average, all that is needed is the previous average, the number of samples that generated the previous average, and the new sample.

The intelligent agents allow changing the existing bias of moving data to centralized repositories for processing. This is done by moving processes (intelligent agents) to the origin of data creation, to the edges of networks. This improves over the current systems of sending data to the cloud for processing. This provides for real-time data cleansing, filtering, enriching, and analyzing being local to the streamed creation and orchestration of near continuous, second and sub-second production of data payloads. Edge distillation leads to distribution of information that is often-actionable—tight decision window information, not just raw data or half cooked information. The resulting capability is Real-time Command and Control. The intelligent agents can be at an edge computer, such as a computer or server at the site of a company. Alternately, the intelligent agent can be in a sensor or device itself, sort of a soul of the device. The intelligent agents can be moved—they can migrate from one position to another, either as software, or part of a physical device which is relocated. The location of the intelligent agent is transparent in the system.

Figure 3:
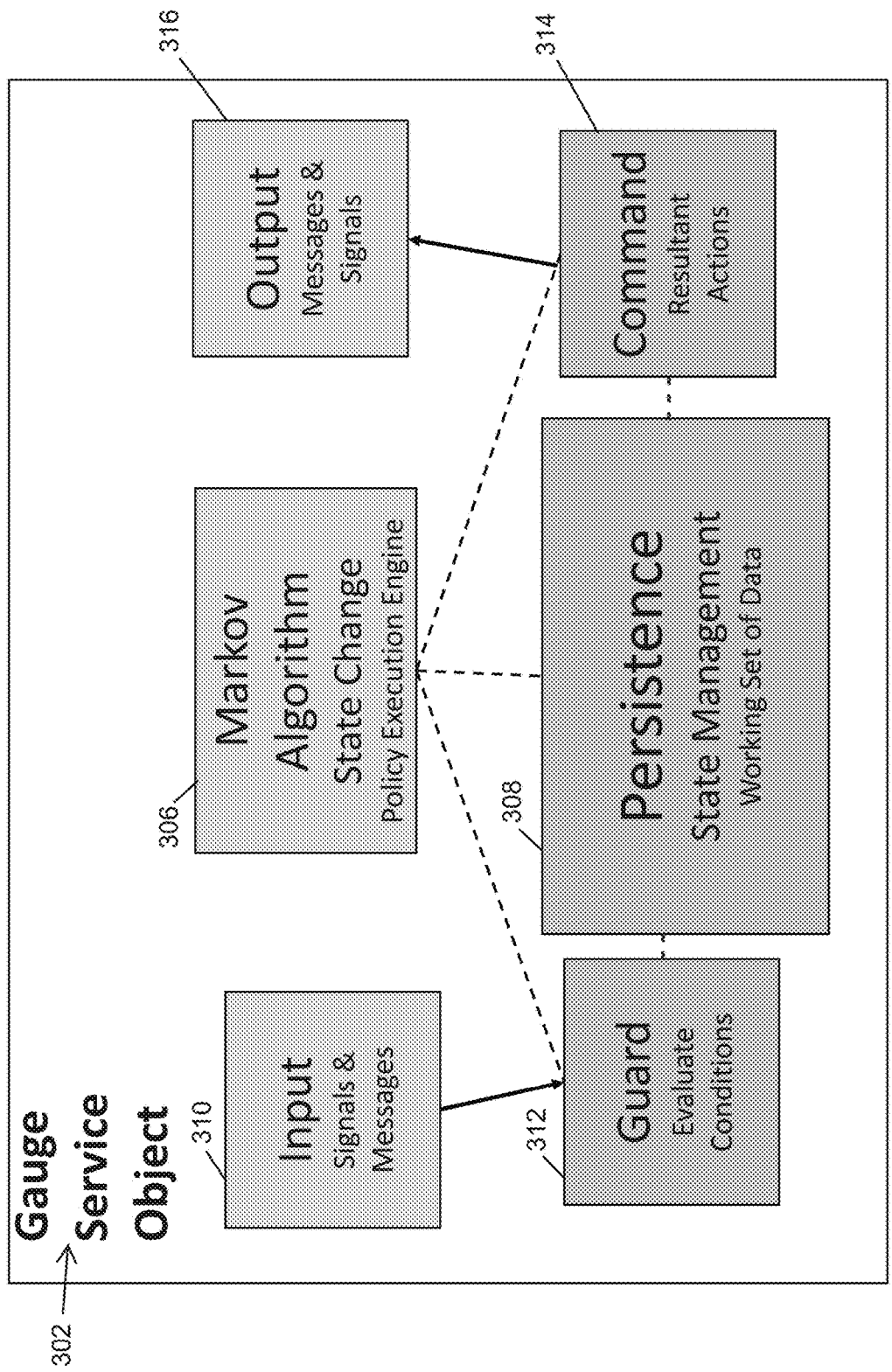
FIG. 3 is a high level diagram of an intelligent agent (digital twin) architecture according to an embodiment.

FIG. 3 is a high level diagram of the architecture of an intelligent agent (digital twin) 220 of FIG. 2 according to an embodiment. The intelligent agent can be implemented in software, firmware, an ASIC, hardware, or otherwise. The intelligent agency architecture provides secure, auto-provisioned environments and methods of specifying, monitoring, and enforcing constraint configuration suites of service level policies. The goal is auto-provisioned, elastic environments providing safe, private, and trusted intelligent agency. Auto-provisioning involves automatically marshalling resources to satisfy service level demands. Elastic implies ability to shrink and expand resources as demand lessens and builds. Nodes are auto-provisioned, elastic, and allow programmable routing and switching. This is true for LAN and WAN connectivity—reifying The Edge and Center of Clouds. The boundary to The Edge is very movable, that is situational. That is very much a part of the elastic nature.

In one embodiment, the blocks of FIG. 3 are each a Python Module and/or a nio Block. The Nio® Platform is designed for Internet of Things solutions. nio blocks allow the design and assembly of distributed systems. Blocks are the basic unit of functionality in nio that consume data streams, perform operations, and emit data streams. Python modules are files containing Python definitions and statements. A Python module can have a set of functions, classes or variables defined and implemented, and can include runnable code.

As shown in FIG. 3, a digital twin is described as a Service Gauge Object 302. The digital twins are virtual entities that mirror and actuate all objects of interest, including devices, sensors, and processing resources. The memory of Persistence State Management module 308 stores the object data representing the service gauge object. The object data feeds a Markov Algorithm module/block 306, which includes a policy execution engine that dictates state changes that are fed to a Persistence State Management module/block 308. (18). The Markov Algorithms are lists of Guarded Commands that evaluate Input Signals and Messages from a module/block 310 monitoring the physical object (physical twin). A Guard module/block 312 evaluates the conditions from Input module/block 310, and determines needed changes in state that are provided to Markov Algorithm module/block 306. The changes are evaluated within Working Set that correspond to the collection of information referenced by a process during a process time interval. Needed commands to the physical twin are generated in Command module/block 314 under the direction of Markov Algorithm module/block 306. The commands are provided to the physical twin view output module/block 316. The physical twin is the actual sensor, device, process, etc. that is mirrored by the digital twin represented by gauge service object 302. The Markov algorithm module 306 evaluates the data filtered through the Guard 312. Conditions are compared to see if they match a condition with an associated action. The data filtered by the Guard 312 is placed in the memory of Persistence module 308.

In an embodiment, the Markov Engine Intelligent Agents are pico-economic mechanisms for a well regulated electronic Transaction (eTxn) Market. In another example, they operate as process control components in heavy industrial assets like turbines or light industrial assets like construction equipment.

In an embodiment, the object data includes context and content which imply service constraints. The context may include other sensors, objects or processes the object interacts with, or time and/or location. Below is an example definition for a gauge service object 302:

{([gauge*, working data set], [service category, service level definition, price, compensating action*])*}

A service is a list of guarded commands embedded in a service programming contract of {precondition, invariant and post-condition}. The execution model is a state machine {Beginning Middle End, resp.} implemented using a Block Computer Model. Below are examples of syntax, semantics and details:

Syntax
<svc:<pre:<statement><lop:<imp><inv:
<statement>><mrkalg:{<statement><action>}*><post:
<statement>>>

Semantics
If pre:<statement> then while inv:<statement> iterate through {<statement><action>}*performing <action> of first true <statement>, ending when no <statement> is true or a cmd:<halt> is a encountered in an executed <action> whence (fail(post:<statement>))

Details
<statement> is any logical expression
<action> is any imperative cmd

In an embodiment, the Markov Algorithm module/block 306 has a policy constraint process implemented as a list of Dijkstra Guarded Commands. The commands are structured to support a triggered repetitive read of the list of guarded commands to be executed, performing implied actions until nothing applies or an explicit exit is issued. For execution, for each policy, the process marshals the inputs and persistent data, applies guard conditions, and performs the command and output functions. Below is an example:

```
<policy>     # Fill in <condition> and <action> for each <guard> entry
{
  <guard>
      <condition>
      </condition>
      <action>
      </action>
  }*
</policy>
```

The below example is in C++, but can be converted into Python, with no multiple inheritance:

```
# include xmldef.h
# include markovEngine.h
def markovEngine( grdCmdList )
    # INPUT list of guarded commands where guard and action
    are each an xml doc
    # OUTPUT some type of document of messages and signals
    struct    grdCmdList[ ]
        guard;       # logical statement in Polish Suffix form
        action;      # list of commands in Polish Suffix form
    process = NOHALT
    i = 0
    while( process != HALT ) {
        if( guard[i] != NULL && evalGuard( guard[i] ):
```

```
        if( process = ( retval = exec( action[i]) ) == HALT ):
            break
        i++
    }
    return( retval )
```

In an embodiment a Markov Algorithm is provided as a template json file. It is loadable and executable as Reference Behavior of and Execution Engine:

```
==================FILE=========================
{
    "0" :
    {
        "Name" : "<PolicyItemRule>",
        "Version" : "v1.1",
        "Date" : 20190507,
        "Description" : "Markov Algorithm as list of guarded commands",
        "Reference" : [
            "https://www.dropbox.com/s/48h2qrancg68jsx/
TheRuleofOrderPart%20I--6.0-2013Q1.pdf?dl=0",
            "https://www.dropbox.com/s/qwxgs8t7vohw0ze/
Enterprise%20Policy%20Development%20and%20Support-
v2.7.pdf?dl=0e"]
    },
    "1" :
    {
        "guard":"Rule == 1",
        "action":"print('Rule = ', Rule)\nsys.exit( )",
        "state": "status = 'Active'"
    },
    "2" :
    {
        "guard":"Rule == 2",
        "action":"print('Rule = ', Rule)\nsys.exit( )",
        "state": "status = 'Quiet'"
    }
}
==================END===========================
```

In an embodiment a Markov Algorithm is represented as json Policy per a Template:

```
==================FILE=========================
{
    "0" :
    {
        "Name" : "Test1",
        "Version" : "v1.1",
        "Date" : 20190507,
        "Description" : "Markov Algorithm as list of guarded commands: Test Case 1",
        "Reference" : [
            "https://www.dropbox.com/s/48h2qrancg68jsx/
TheRuleofOrderPart%20I--6.0-2013Q1.pdf?dl=0",
            "https://www.dropbox.com/s/qwxgs8t7vohw0ze/
Enterprise%20Policy%20Development%20and%20Support-
v2.7.pdf?dl=0e"]
    },
    "1" :
    {
        "guard":"Rule == 1",
        "action":"print('Rule = ', Rule)\nsys.exit( )",
        "state": "status = 'Active'"
    },
    "2" :
    {
        "guard":"Rule == 2",
        "action":"print('Rule = ', Rule)\nsys.exit( )",
        "state": "status = 'Active'"
    }
}
==================END===========================
```

In an embodiment a Markov Algorithm Policy Execution Engine is provided as a Python Package:

```
==================FILE=========================
# Markov Algorithm Executor Package
# v4.0
# 20190507
# INPUT         list of guarded commands where guard and action
#               are each a Python eval( ) and exec( ) expression, resp.
# OUTPUT        changes to globals( ), locals( ) environments
# grdCmdList[ (guard, action, state) ]
#     guard            # logical statement in Python string
#     action           # list of commands in Python string--
#                      #    suite of statements as a
#                      #    string (an open macro, '\n' as
#                      #    newline, '\t' for ondent tab),
#                      #    or, a compiled program object
#     status           # Operative State of the Rule: Active/Quiet/Deprecated/<etc>*
#     json_file_name   #    string name of location of the grdCmdList
# This execution engine is equivalent to a Turing Machine!!
# Transform json serialized str from a .txt formatted file into internal Canonical form as a List of tuples
def loadGCL(grdCmdList, json_file_name):
    import json
    f = open(json_file_name)
    policy = f.read( )                                      # policy per template
https://www.dropbox.com/s/ela9df4dxxehgdc/PolicyTemplate.json?dl=0
    grdCmdJsonList = json.loads(policy)                     # to a Dict of Dicts from json as serialized string
    # assemble grdCmdList into the Canonical form List via a loop of appends
    jsondictlen = len(grdCmdJsonList)
    grdCmdList = [ ]                                        # Define the object as a List
    i = 1                                                   # '0' keys
```

-continued

```
documentation of Policy in grdCmdJsonList Dict
        while i < jsondictlen:
            gc = grdCmdJsonlist[str(i)]        # get next guarded command entry as
a Dict
            grdCmdList.append([ gc["guard"], gc["action"], gc["status"] ])
            i = i + 1
        # grdCmcList[ ][ ] is transformed into a list of tuples
# The Policy Executive
def pyMarkovEngine( grdCmdList, globals( ), locals( ) ):
        HALT = False
        i = 0
        while i < len(grdCmdList) and HALT == False:
            if grdCmdList[i][0] == " or eval(grdCmdList[i][0]) == True:
                exec( grdCmdList[i][1] )
                if HALT == True:
                    break
                i = 0
            i = i+1
#        (c) copyright 2013-19, David M. Sherr dmsherr@gmail.com
==================END==========================
```

In an embodiment, the Persistence module/block 308 provides for maintenance of the stored data and corresponding formats for the Working Data Set. This is dynamic and constantly changing.

In an embodiment, the Input module/block 310 receives inputs through the Virtual Entity Backbone (VEB) 102 and Virtual Data Store (VDS) 104 from devices, sensors, and processes. For example, a thermostat might provide a current temperature, a remaining battery life, the various temperature settings and associated times. A smart thermostat would provide more complex data, such as learned user interactions, which can be used for learning user preferences and updating a schedule. In an alternate example, data from a process, such as a vendor supply contract administration process, is provided. The object data is stored in the Persistence block 308 since the Intelligent Agent is a twin.

In an embodiment, the Guard module/block 312 evaluates stored conditions relating to input signals and messages from Input module/block 310, and forwards ones that meet certain conditions to Markov Algorithm module/block 306. It thus provides a filtering function. For example, taking the thermostat example, the condition may be a temperature above 72 degrees Fahrenheit, so a temperature of 71 degrees would not cause a message to Markov Algorithm module/block 306, while a temperature of 73 degrees would. The Digital Twin Intelligent Agent 220 stores the object data in the Persistence block 308.

In an embodiment, the commands to the physical and digital twin are generated in Command module/block 314 under the direction of Markov Algorithm module/block 306. The commands are provided to both twins through output module/block 316. The Output module/block 316 provides outputs as inputs through the Virtual Entity Backbone (VEB) 102 and Virtual Data Store (VDS) 104 back to the devices, sensors and processes.

FIG. 4 is a diagram of a service level constraint profile matrix 402 to determine resource provisioning according to an embodiment. This provisioning matrix 402 provides constraints for various functions and activities, so that performance can be monitored and adjusted to stay within the constraints. The left-most column indicates the various activity realms (counterparty, channel, etc.), and the top row lists the service categories (performance, availability, etc.) for those activity realms. The limits for each service category are auto-provisioned to the intelligent agents (digital twins) for specifying, monitoring, and enforcing constraint configuration suites of service level constraints 404. Each suite is a row of service level constraints 404 in matrix 402.

In an embodiment, each of the squares or elements 404 of the matrix 402 specify a set of service level constraints that include Gauge(s), Relevant Data, Intelligent Agent Policy Monitor List with Outcomes, including Accounting Entry Transactions. An example field specification is below:
{([gauge*, working data set], [service category, service level definition, price, compensating action*])*}

In the API services economy, service level demand specification ranges over all realms of business activities, by category of demand. The service categories are gleaned from IT operations that mimic real world ops, these are the key indicators of fitness for business purpose.

The Performance service category 406 deals with, for example, a profile of interactions, objects of interest over time, and bandwidth. The Availability service category 408 deals with, for example, promised up time. The Mean Time to Recovery service category 410 deals with, for example, a promised return of minimum operational capabilities after a system outage. The Transactional Level service category 412 deals with, for example, whether a function or service is guaranteed or not, the service will be performed at least once or at most once, or whether the service is cloaked or open. The Data Replication & Retention service category 414 deals with, for example, the dating of data stores, the share level of data, and life cycle profiles. Security Level service category 416 deals with, for example, different security settings depending upon the environment, bubbles of protection, and breaches per time period.

The business activity realms set forth different sectors to which the matrix service categories may be applied differently. As an example, retail goods is a global activity sector set of use cases for realms in which Intelligent Agents operate according to service level profile specifications. Those specifications relate to monitoring and controlling IT, i.e., Digital Twins, mimicking real world operations.

The Counterparty realm 418 is composed of, for example, other entities that are interacted with through, for example, activities, Interactors (people, processes, or machines), and recruitment programs. The Channel realm 420 is composed of, for example, the product/service sales distribution pathways covering orders and modalities of sales management.

The Supply Chain realm 422 is composed of, for example, a tuple list of service level demands on an IT environment supporting the production, storage, movement, and control of goods and services. An example service level profile use case is as follows: A material handling asset, e.g., a forklift, operates in a venue, such as a warehouse. The forklift moves workloads (e.g., Pallets) of goods, from shelves to a loading dock bay to a truck, and vice versa. An activity realm's Service Level Constraint (SLC) may be expressed, for example, as a tuple (a sequence of immutable Python objects). One example of such a tuple has the following sequence:

Performance: For a fleet of 400 lifts, transmit, store, and process the data stream of sensor payloads of 40 bytes/sec with <2 secs latency;
Availability: For operational hours, processing happens at least 99.9% of time (>=525.6 mins/year);
Mean Team to Recovery: For operational hours, processing is restored in <=262.8 mins on average/year;
Transactional Level: For operational hours, sensor payloads are best efforts delivery;
Data Replication & Retention: For operational hours, all sensor payloads are backed up and kept in perpetuity;
Security Level: For operational hours, data are SSL encrypted during transmission and 3DES in retention.

The Commodities: Products & Services realm 424 is composed of, for example, all goods and services that go to Commodity status. Example Service Level Profile:
- Performance: For a fleet of 400 lifts, transmit, store, and process the data stream of sensor payloads of 40 bytes/sec with <2 secs latency;
- Availability: For operational hours, processing happens at least 99.9% of time (>=525.6 mins/year);
- Mean Team to Recovery: For operational hours, processing is restored in <=262.8 mins on average/year;
- Transactional Level: For operational hours, sensor payloads are best efforts delivery;
- Data Replication & Retention: For operational hours, all sensor payloads are backed up and kept in perpetuity;
- Security Level: For operational hours, data are SSL encrypted during transmission and 3DES in retention.

The Codex: Books & Records realm 426 is composed of, for example, chronicles of the business. dealing with sovereign jurisdictions, legal entity accounting, treasury, and regulatory maintenance.

Figure 5:
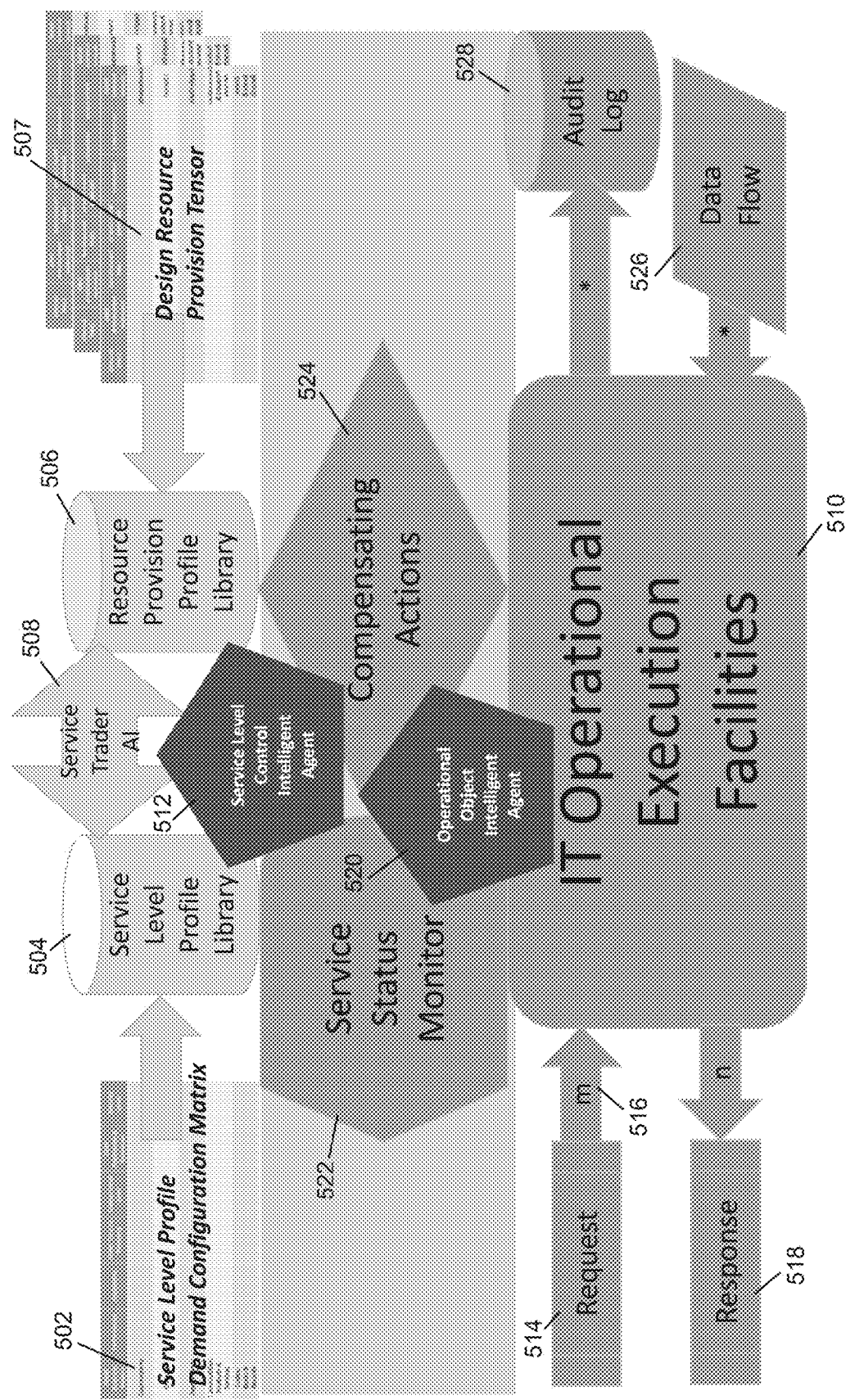
FIG. 5 is a diagram of an architecture for provisioning and managing intelligent agents (digital twins) according to an embodiment.

FIG. 5 is a diagram of an architecture for provisioning and managing intelligent agents (digital twins) according to an embodiment. This is an intelligent agency architecture for secure, auto-provisioned environments. It provides methods of specifying, monitoring, and enforcing constraint configuration suites of service level policies. A definitional application 502 sets forth IT operating environment service level requirements that constructed as the matrix 402 of FIG. 4, a matrix of service level profiles, e.g., Performance, Availability, Security, etc., for a particular realm (e.g., the Supply Chain realm 422. The Service Level Profile matrices are stored in a profile library 504.

There is a complementary Resource Provision Profile Library 506 that is provisioned by a Design Resource Provision Tensor 507. Tensor 507 provides the resources required for each service level offering (SLO) with an appropriate (e.g., pricing) matrix. Through a configuration application 508, service providers create Resource Provision Profiles for available IT system designs. These Resource Provision Profiles are stored in Resource Provision Profile library 506.

A Service Trader Artificial Intelligence module 508 draws on the two libraries 504, 506 to generate service level constraints for the relevant cells 404 of the provisioning matrix 402 of FIG. 4. The Service Trader AI 508 automatically provisions an IT environment within IT Operational Execution Facilities 510, subject to the agreed upon constraints, the Designated Service Level Profile, and an Active Context established by the Service Trader AI 508.

The Service Trader AI 508 spawns one Service Level Control Intelligent Agent 512 for each Service Level Constraint active in the Designated Service Level Profile matrix from library 504. Each Service Level Control Intelligent Agent 512 has an auto-restart capability enabled through a heartbeat to the Designated Service Level Profile managed by the Service Trader AI 508.

Interactors are given access to the IT Operational Execution Facilities 510 governed by permissions and the Designated Service Level Profile's Service Level Control Intelligent Agents 512. Interactors make Requests 514 that ramify into possibly multiple Service Requests 516 to the IT Operational Execution Facilities 510, which in turn produces possibly n multiple Responses 518 for each Request 514. The Request is handled by Operational Object Intelligent Agents 520 which manage the Objects of Interest within the IT Operational Execution Facilities 510. Operational Object Intelligent Agents 520 make the needed changes to the object data placed in the memory of Persistence module 308 of FIG. 3.

While the wheel turns for the cycle of "Request 514/Ramify 516/Handle 520/Emitted Outputs n/Response 518," a Service Status Monitor 522 maintains and executes suites of oversight policies for alerting Service Faults to the spawned Service Trader AI 508 Designated Service Level Profile's Service Level Control Intelligent Agents 512. When Service Faults occur, adjusting Compensating Actions 524 are possibly inserted into the IT Operational Execution Facilities 510.

As continuous background and foreground processes, Data Flows 526 into the Virtual Data Store of the IT Operational Execution Facilities 510. For accounting, trouble-shooting, and traceability, all Interactor and system activity is logged to a non-destructive Audit Log 528. The IT Operational Execution Facilities 510 are virtual and thus can be distributed and represented by federated clouds (such as 106, 108 & 110 of FIG. 1), via the Virtual Entity Backbone 102.

Another way to look at the system is as different planes of activity. A first, top layer plane is a mindful business model covering definitions, deployment, and control, involving 502-508 and 512. A middle layer is composed of neural nets for monitoring and control, involving 512, 522 and 510. A bottom layer provides transformational actions including operations, processing, storing, and forwarding, involving 510, 514, 516, 518, 520, 526 and 528. In the Software Defined nature of this architecture, 512, 520, 522 and 524 represent the Control Layer, and 510, 514, 516, 518, 526 and 528 represent the Work Layer.

More details of the different functions are as follows. Service Level Profile Configuration Matrix 502 is the structure of a demand specification for service levels (by Activity Realm, by Service Category). A Service Level Profile Completion Process fills in the cells of the matrix 502 and stores them in Service Level Profile Library 504. This library is a directory of matrix completed templates. The Resource Provision Profile Library 506 is the directory of resources required per various IT design configurations, such as with pricing for each SLO. The Service Trader Artificial Intelligence 508 handles the constraint establishment process, people-to-people interactions and machine-to-machine interactions, augmented with automated decision sets.

Design Resource Provision Tensor 507 provides resources required for each SLO, such as with a pricing matrix. Using a completion process, Tensor 507 provides definitions of provisioned resourcing for each SLO and pricing matrix. Service Level Control Intelligent Agent 512, for each matrix 402 cell, spawns a service level control IA. Operational Object Intelligent Agent 520, for each gauge, device, sensor, activity, spawns an Operational Object IA. Service Status Monitor 522 provides policy suites for alerting faults, complete with a dashboard user interface, Application Programming Interface, and knowledge interface. Compensating Actions 524 provides actions precipitated from service level faults.

IT Operational Execution Facilities 510 provides venues in which Operational Object IAs 520 are instantiated, connected, and run. A Request 514 contains signatures of service suites. This can translate into m service requests, which involve an invocation of possibly multiple services per their respective signatures. There may be possibly n multiple messages emitted from each Request, providing Response presentations 51. The format of response may be, e.g., a document, j son, xml, html. Data Flow 526 is an ad hoc and streaming data flow from all sources, external and internal. Activity logging to Audit Log 528 includes the recording of activities, both interactor and system alike. The Audit Log 528, in an embodiment, is a inspectable, write-once/read-many, non-erasable store for traceability of all activities used in trouble-shooting, regulation, accounting, and recovery.

Figure 6:
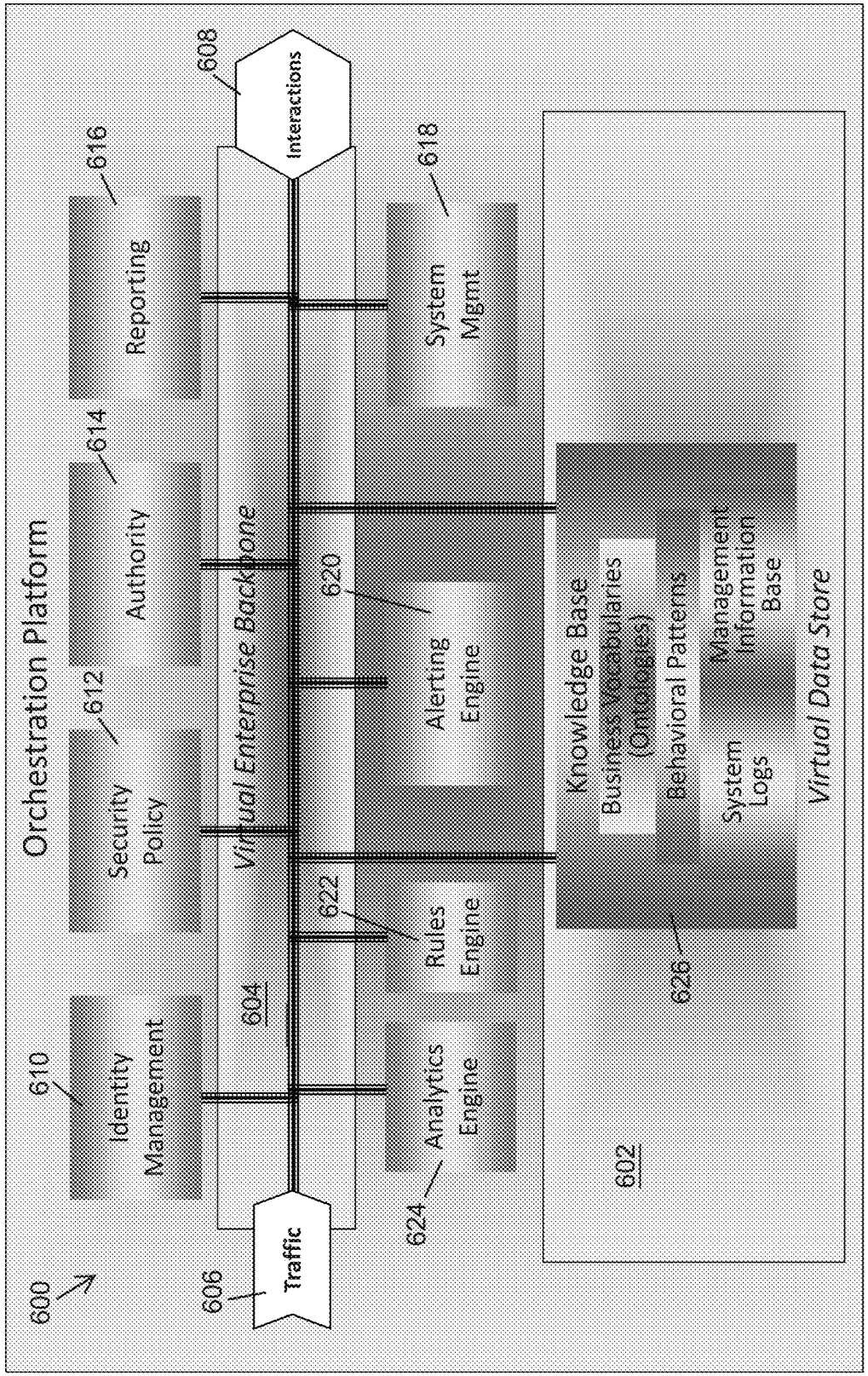
FIG. 6 is a diagram of a business overlay layer for a Software Defined Secure Content/Context Aware Network (SD-SCAN) according to an embodiment.

FIG. 6 is a diagram of a business overlay layer for a Software Defined Secure Content/Context Aware Network (SD-SCAN) according to an embodiment. The Secure Content/Context Aware Network has technology portfolio sectors of services that implement Instruction Points and Control Points within the IT Operational Execution Facilities 510 of FIG. 5. This may be provided by possible third party suppliers, including Open Source. SCAN tracks signals, messages, and sessions that result in Create, Read, Update and Delete (CRUD) of Enterprise Resources. CRUD is the classes for a transaction and Enterprise Resources include Money, Digital Information, Client Data, and Goods/Services. Content Awareness allows policy-based distribution of messages with real-time traffic control. Context Awareness allows processing data at the Edge. Real-time filtering, transforming, enriching, and analyzing data is done at the perimeter.

The Orchestration Platform 600 of FIG. 6 functions to integrate data and processes amongst the component services in tracking of the traffic and interaction sessions. The Orchestration Platform has two basic substrates, the Virtual Data Store 602 and the Virtual Enterprise Backbone 604. These two substrates supply and connect any and all Service Level Controls (512 of FIG. 5) and Operational Objects (520 of FIG. 5). For network Traffic 606 that drives Interactions 608, signals, messages, and data streams are authenticated (610), secured via policies (612), permitted access (614), resulting in exception reports (616).

Traffic (606) is tracked, monitored, and controlled via System Management Services 618. Important system and application conditions and messages are alerted with an alerting engine 620 to System Monitor Dashboards and Gauges via Reporting Services 616. Some Traffic produces messages and events via tracking (a) by classic Rule Services in a rules engine 622, or, (b) advanced Analytics Services in an analytics engine 624, involving algorithms and Artificial Intelligence methods. Inferences via both (a) and (b) are based on processing large amounts of data, streaming and stored. At the core of the Virtual Data Store 600, there is the system Knowledge Base 626 which contains all the concepts, methods, records, and, derived information and knowledge.

Here is a further summary of the component services. Identity Management 610 provides authentication services and key and certificate management services, e.g., OAuth (Open Authentication), PKI or X509. Security Policy 612 provides services that cover the set of rules, notification event dispatch, and possibly autonomic actions to intercede, prevent and/or correct security faults. Authority Server 614 provides management services for role based permissions, including issuance of Access Certificates such as SAML 2.0. Reporting module 616 provides structured reports such as Business Sessions Alert Reports; active real-time dashboards and visualizations.

Analytics Engine 624 provides Services for both (a) Descriptive Analytics like ABC Inventory Analysis or Object Profiles, and, (b) Predictive Analytics like Bayes-based, Machine Learning, Deep Learning, or, General Artificial Intelligence. Rules Engine 622 provides inference management services based on (a) prescriptive technologies like OWL, RDF, and Protégé, and (b) Machine Learning like TensorFlow. Alerting Engine 620 provides services that oversee patterns of interest and raise events to be handled by an appropriate process. System Management 618 provides services to collect and store instrumentation data and provide visibility on system processes. Knowledge Base 626 provides the core persistent store of semantic information (ontologies), behavioral patterns of interactions, log of system access and use and base of instrumentation data.

Computer Diagram

Figure 7:
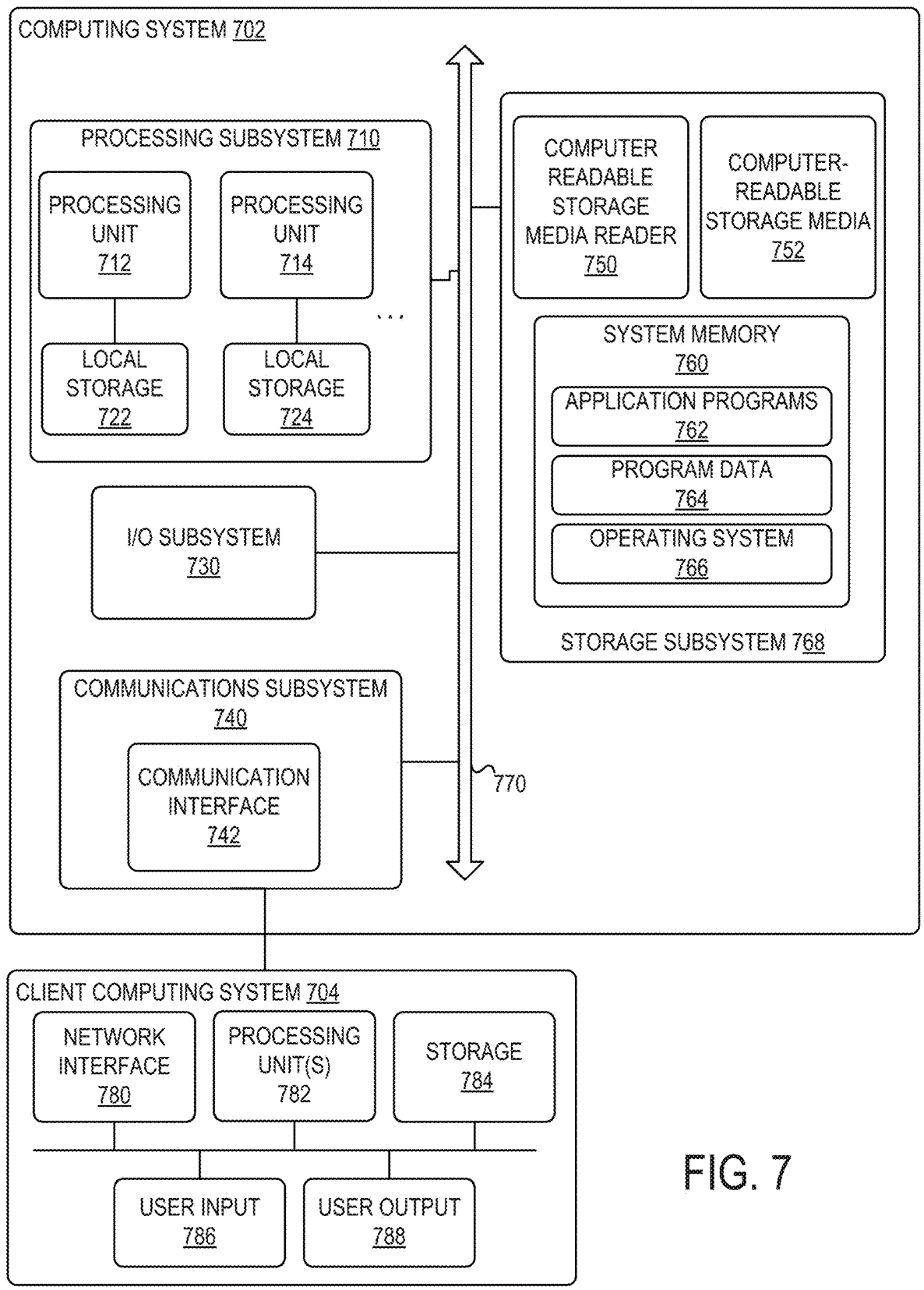
FIG. 7 is a diagram of a computer or server for devices of the system of FIG. 1 according to an embodiment.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the coordinator server, or any other computing system described herein or portions thereof. Client computing system 704 or similar systems may implement tenant computing devices such as a smartphone or watch with a downloaded application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 9, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 9 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++, Python or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art. For example, the engines and modules of coordinator server 110 of FIG. 1 can be separate program modules on the same or different physical memory, or can be different or overlapping portions of code of a single software program. The GUI matching engine can match the GUI diagrams or match amounts or percentages corresponding to the diagrams.

Thus, although the invention has been described with respect to specific embodiments, it will be appreciated that the invention is intended to cover all modifications and equivalents within the scope of the following claims.

What is claimed is:

1. A secure digital operations system comprising: (a) one or more processors; (b) a digital twin operating as an intelligent agent and corresponding to an object, the digital twin configured to: operate as a digital simulation of the object within the secure digital operations system; and update a corresponding state of the digital simulation based on one or more sensor inputs associated with the object, wherein the digital twin is controlled by the one or more processors; (c) a cloaked network-based communications mesh controlled by the one or more processors, the cloaked network-based communications mesh configured to: communicatively couple the one or more processors to the digital twin within the secure digital operations system; and control the flow of data into and out of the secure digital operations system; wherein the cloaked network-based communications array incorporates a software-defined perimeter (SDP) and a frequency hopping spread spectrum implementation, and (d) a resource provisioning matrix controlled by the one or more processors, the resource provisioning matrix configured to provide a set of adjustable resource constraints for provisioning resources controlling the secure digital operations system, wherein the resources have constraints including at least one of: processing performance; and communications security, wherein the digital twin utilizes the resources as adjusted by the resource provisioning matrix wherein the resource constraints further include system availability, system meantime to recover, and data replication and retention.

2. The secure digital operations system of claim 1 wherein the resource constraints further include performance, transactional level and security level.

3. The secure digital operations system of claim 1 wherein the cloaked network-based communications mesh comprises at least one of (1) a dynamic connection scheme, (2) encryption or (3) ad hoc connections with a certificate.

4. The secure digital operations system of claim 3 wherein the encryption is triple DES or an equivalent or higher level of encryption.

5. The secure digital operations system of claim 1 wherein the object comprises one of a device, sensor or processing resource.

6. The secure digital operations system of claim 1 wherein the cloaked network-based communications mesh is a fractal mesh.

7. The secure digital operations system of claim 1 wherein the digital twin is connected to additional digital twins via a distributed backbone overlay.

8. The secure digital operations system of claim 1 further comprising a codex providing a database of records for the object.

9. The secure digital operations system of claim 1 wherein the digital twin, cloaked network-based communications mesh and resource provisioning matrix comprise a software overlay network.

10. The secure digital operations system of claim 1 wherein the cloaked network-based communications mesh comprises an enterprise backbone overlay mesh.

11. The secure digital operations system of claim 1 wherein the resource provisioning matrix includes a matrix for adjusting the resources of the digital twin.

12. An intelligent agent embodied in non-transitory computer readable storage medium comprising: an input module for receiving object data from a physical object; a guard module for filtering the object data according to stored conditions to provide filtered data; a Markov algorithm module for evaluating the filtered data compared to an action for a condition, wherein the Markov algorithm module further comprises lists of guarded commands to evaluate input signals and messages from the input module monitoring the physical object; a persistence module for storing state data from the Markov algorithm module; a command module for issuing commands to the physical object, which is a physical twin of the intelligent agent, in response to conditions being met; an output module for providing commands to the physical twin of the intelligent agent; wherein the modules are one of a Python module or a nio block; and wherein the intelligent agent is one of a pico-economic mechanism for a regulated electronic transaction market or a process control component for industrial assets.

* * * * *